July 12, 1960     F. A. ZIHERL ET AL     2,944,546
PORTABLE RESPIRATORS FOR ANESTHESIA AND OTHER PURPOSES
Filed Aug. 24, 1954     6 Sheets-Sheet 1
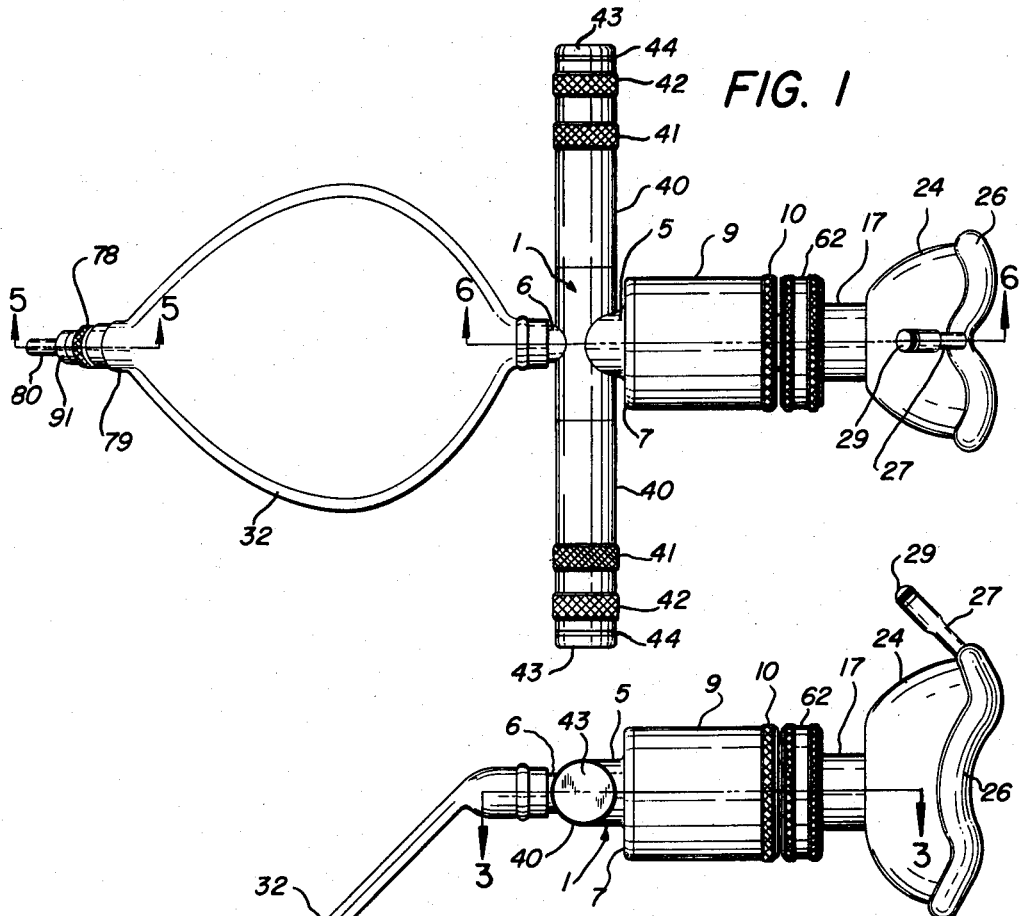
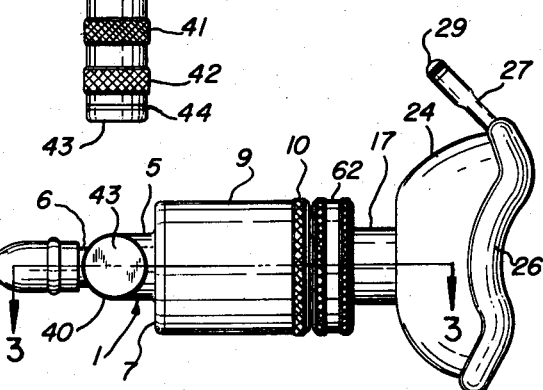
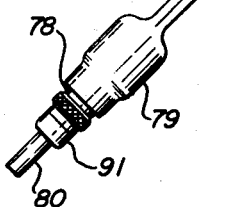
INVENTORS
FRANK A. ZIHERL
ARTHUR S. KISH
BY ROBERT A. HINGSON
ATTORNEYS July 12, 1960 F. A. ZIHERL ET AL 2,944,546
PORTABLE RESPIRATORS FOR ANESTHESIA AND OTHER PURPOSES
Filed Aug. 24, 1954 6 Sheets-Sheet 2
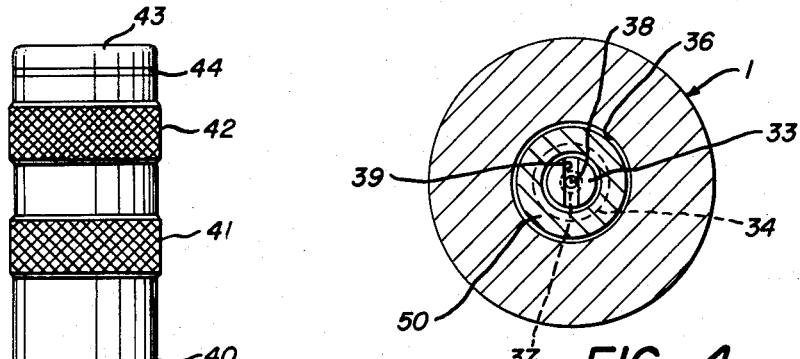
FIG. 3
FIG. 4
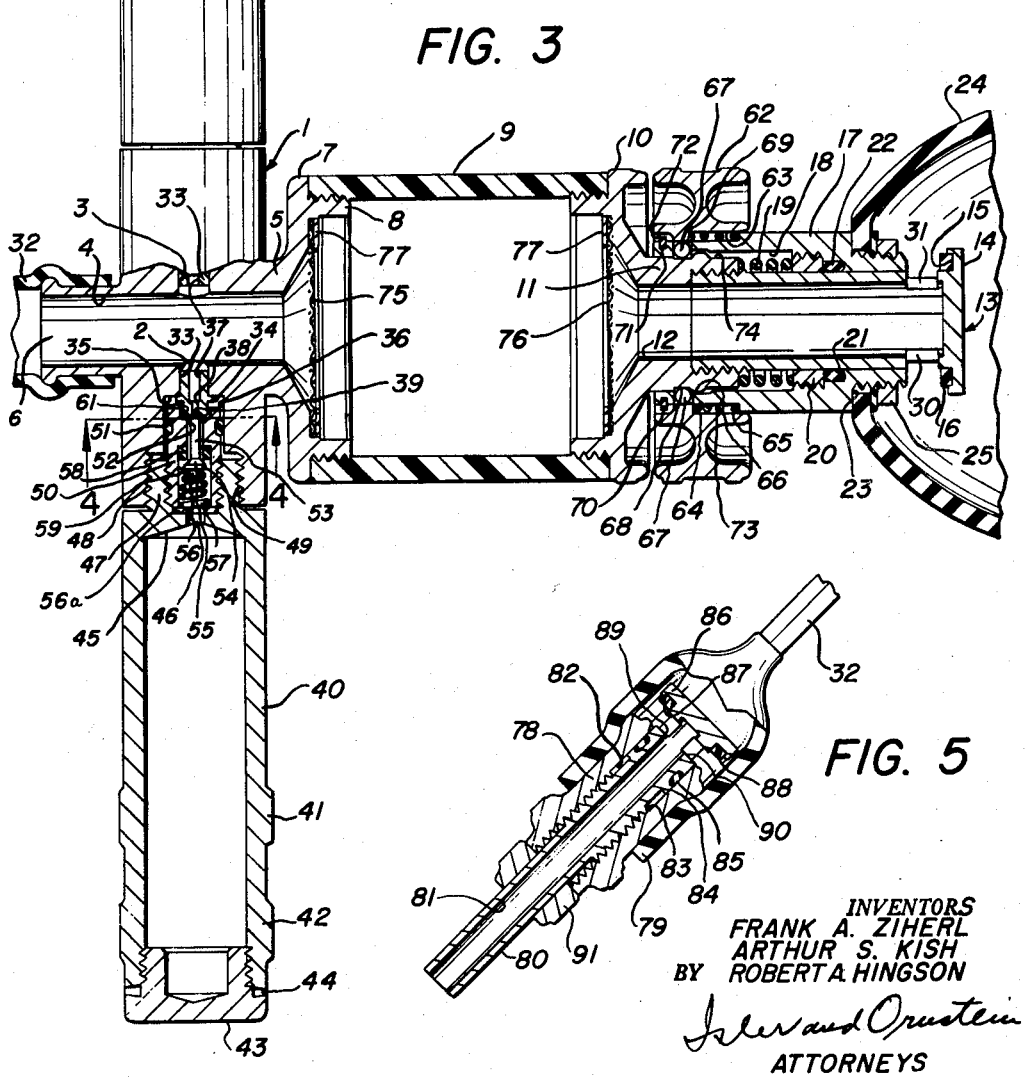
FIG. 5
INVENTORS
FRANK A. ZIHERL
ARTHUR S. KISH
BY ROBERT A. HINGSON
ATTORNEYS July 12, 1960　　F. A. ZIHERL ET AL　　2,944,546
PORTABLE RESPIRATORS FOR ANESTHESIA AND OTHER PURPOSES
Filed Aug. 24, 1954　　6 Sheets-Sheet 3
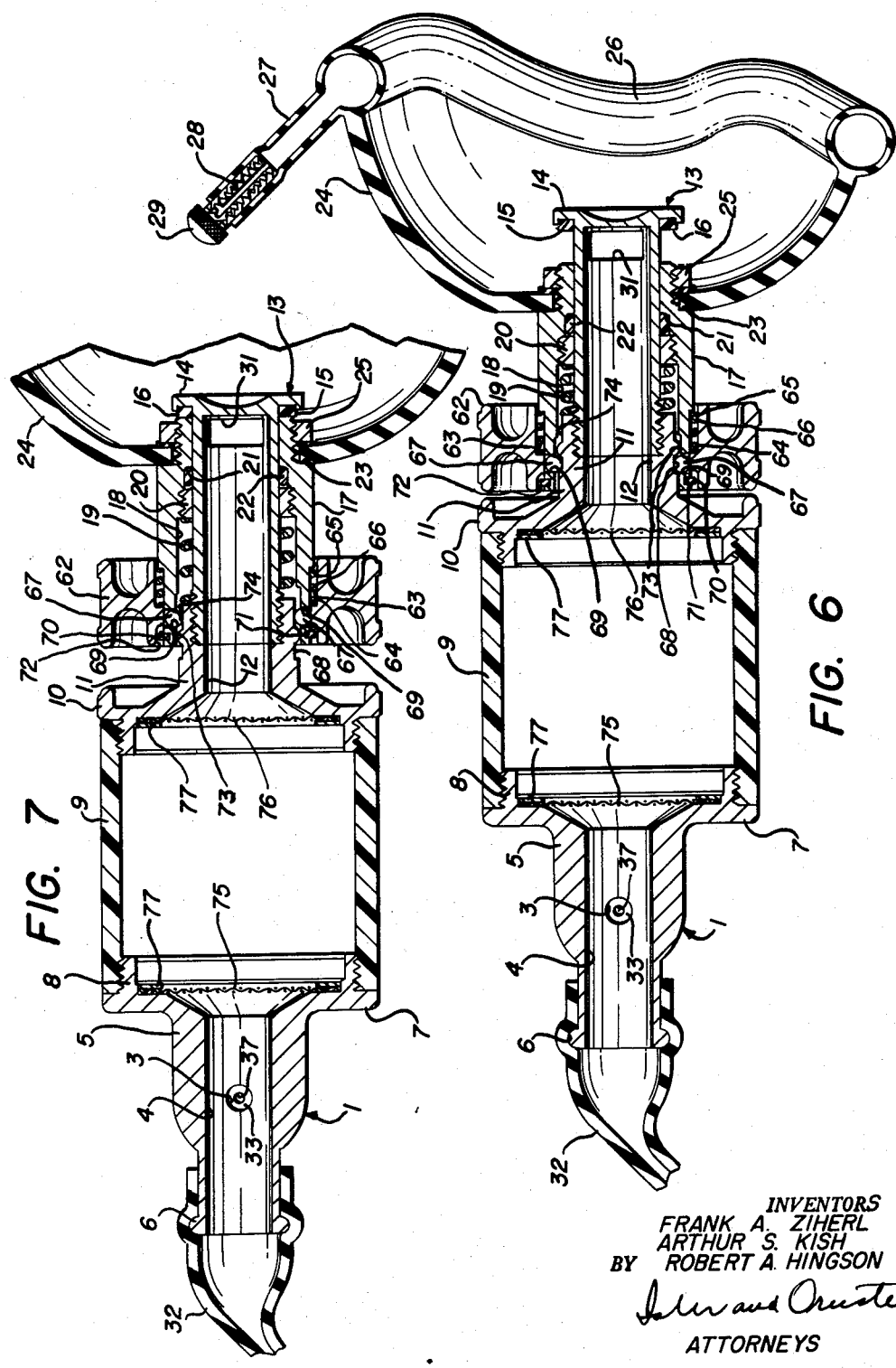
INVENTORS
FRANK A. ZIHERL
ARTHUR S. KISH
BY ROBERT A. HINGSON
ATTORNEYS July 12, 1960     F. A. ZIHERL ET AL     2,944,546
PORTABLE RESPIRATORS FOR ANESTHESIA AND OTHER PURPOSES
Filed Aug. 24, 1954     6 Sheets-Sheet 4

INVENTORS
FRANK A. ZIHERL
ARTHUR S. KISH
BY ROBERT A. HINGSON

*Isler and Ornstein*
ATTORNEYS

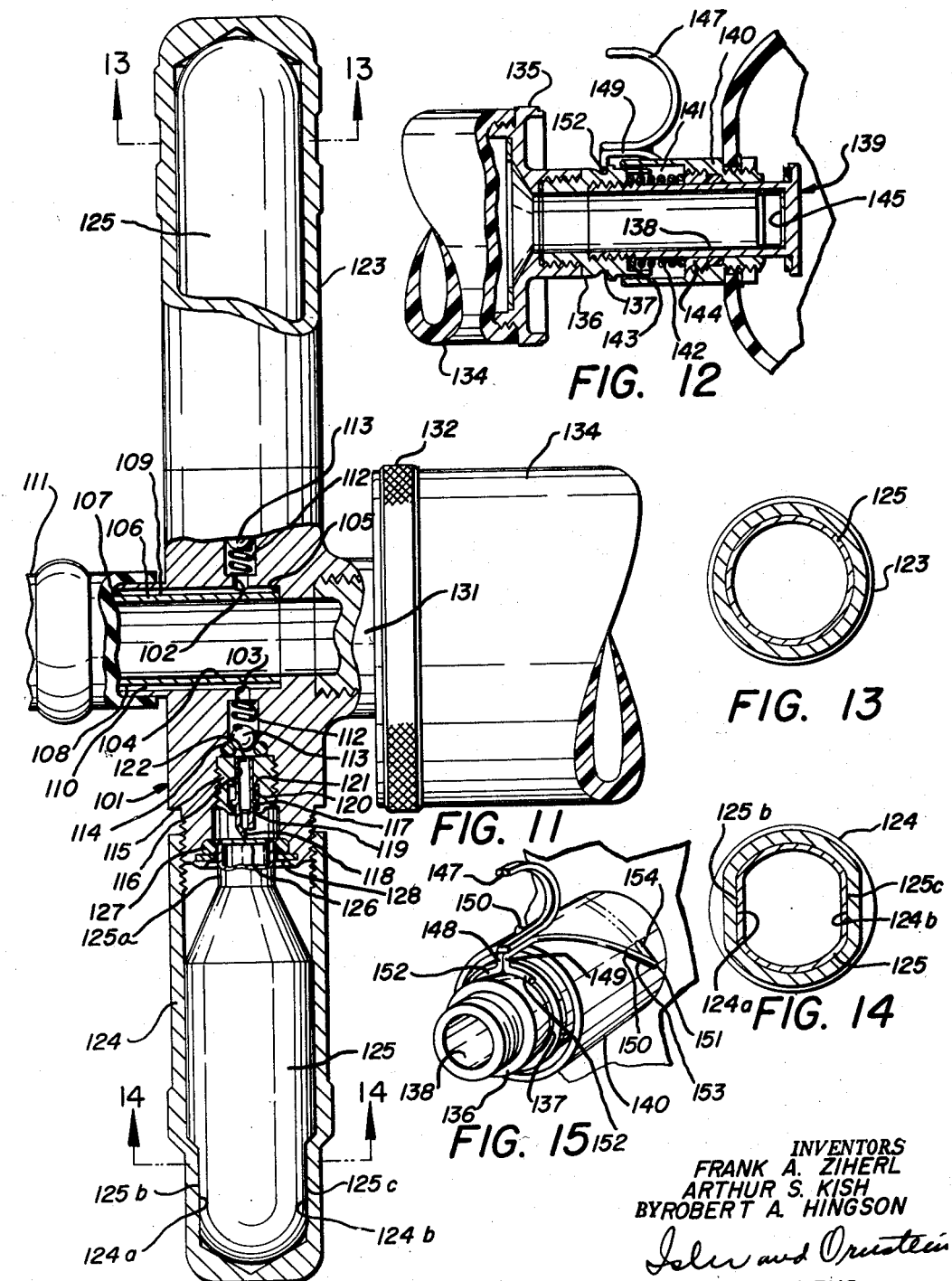
July 12, 1960 F. A. ZIHERL ET AL 2,944,546
PORTABLE RESPIRATORS FOR ANESTHESIA AND OTHER PURPOSES
Filed Aug. 24, 1954 6 Sheets-Sheet 5
INVENTORS
FRANK A. ZIHERL
ARTHUR S. KISH
BY ROBERT A. HINGSON
ATTORNEYS

United States Patent Office 2,944,546
Patented July 12, 1960

1

2,944,546

PORTABLE RESPIRATORS FOR ANESTHESIA AND OTHER PURPOSES

Frank A. Ziherl, Cleveland, Arthur S. Kish, Mayfield Heights, and Robert A. Hingson, Cleveland Heights, Ohio, assignors to Z and W Manufacturing Corporation, Wickliffe, Ohio, a corporation of Ohio Filed Aug. 24, 1954, Ser. No. 451,906

24 Claims. (Cl. 128—203)

This invention relates generally to portable respirators for anesthesia and other purposes, but has reference more particularly to devices of this character which are extremely compact and inexpensive.

Anesthesia apparatus presently available is usually extremely heavy or cumbersome, difficult to use or manipulate, and very expensive, so that its purchase is virtually restricted to hospital operating rooms and other institutional facilities, and its use confined to specialists and experts well versed in the administration of anesthetics.

Aside from its cost and other disadvantages, such apparatus presents a serious explosion hazard, as well as a distinct emotional hazard, especially from the viewpoint of children who are about to be anesthetized. Moreover, there is an ever-present hazard which resides in the possibility of a patient being given an overdose of anesthetic, through the use of such apparatus, either by accident, inadvertence or mistake.

The present invention has as its primary object the provision of portable respirators for oxygen, for analgesia, and for other purposes, which are extremely compact and inexpensive, so that they may be purchased not only by hospitals, doctors and professional anesthetists, but by patients and individuals of somewhat limited financial means. For anesthesia purposes, the respirator has the same advantages, except that its use is restricted to trained personnel.

Another object of the invention is to provide devices of the character described, which are extremely light in weight, and easy to use or manipulate.

A further object of the invention is to provide devices of the character described, in connection with which the explosion hazard has been reduced to a minimum, and the emotional hazard likewise reduced to a minimum, thereby greatly expanding the field of use, particularly as to children and timid patients.

A still further object of the invention is to provide devices of the character described, the use of which greatly reduces the possibility of administration of overdoses of anesthetics to patients.

A still further object of the invention is to provide devices of the character described, which are readily adapted for use as an oxygen supply mask, as a mechanical resuscitator, and for general analgesic purposes.

Other objects and advantages of our invention will be apparent during the course of the following description.

In the accompanying drawings forming a part of this specification, and in which like numerals are employed to designate like parts throughout the same, Fig. 1 is a top plan view of one form of the device;

Fig. 2 is a side elevational view of the device shown in Fig. 1;

Fig. 3 is a fragmentary cross-sectional view, on an enlarged scale, taken on the line 3—3 of Fig. 2;

Fig. 4 is a fragmentary cross-sectional view, on an enlarged scale, taken on the line 4—4 of Fig. 3;

2

Figure 8:
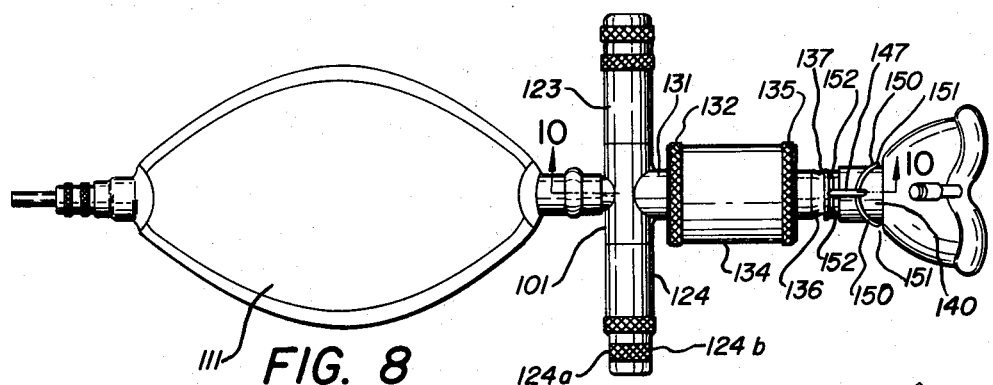
Figure 9:
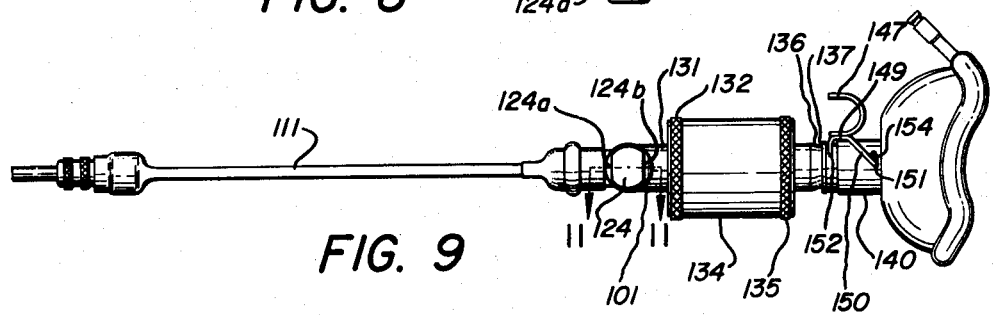
Figure 10:
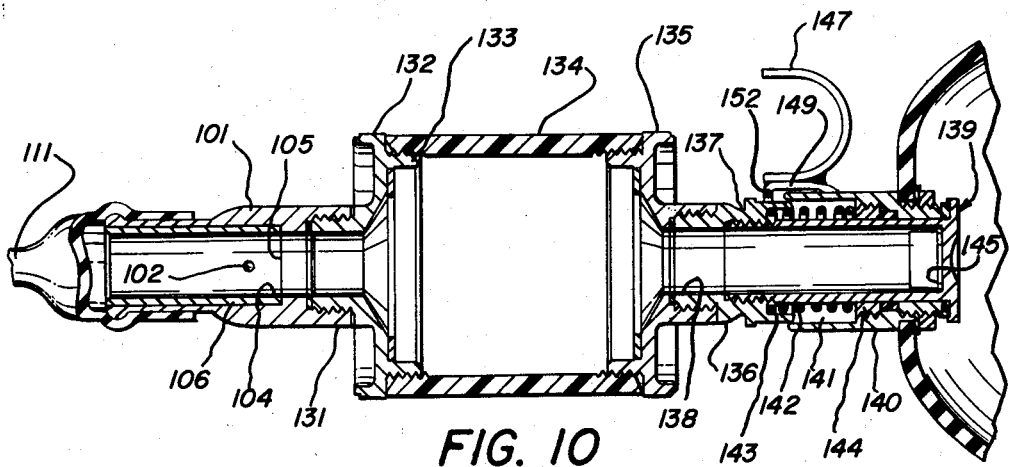
Figure 16:
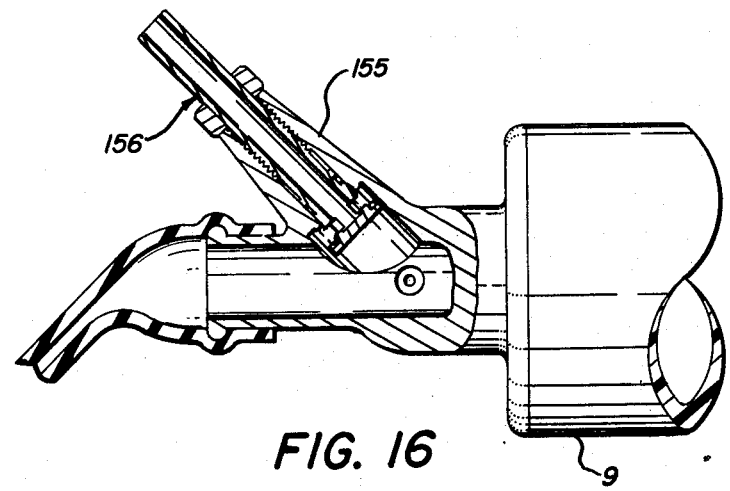
Figure 17:
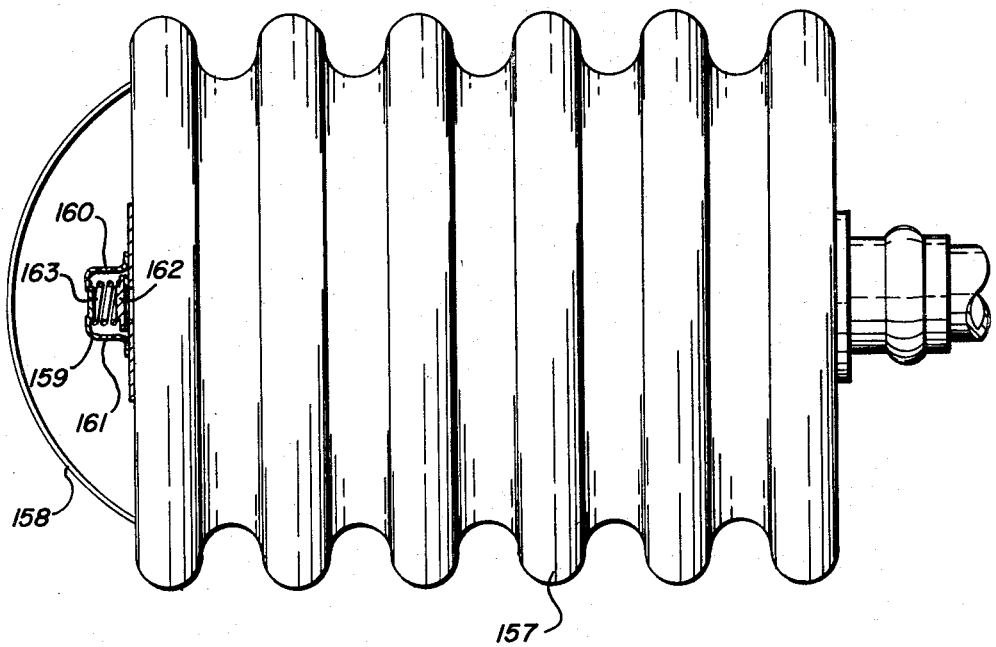

Fig. 5 is a fragmentary cross-sectional view, on an enlarged scale, taken on the line 5—5 of Fig. 1;

Fig. 6 is a fragmentary cross-sectional view, on an enlarged scale, taken on the line 6—6 of Fig. 1;

Fig. 7 is a view similar of Fig. 6, but showing the mask valve in open position;

Fig. 8 is a view similar to Fig. 1, but showing a modified form of the device;

Fig. 9 is a view similar to Fig. 2, but of the modified form of device;

Fig. 10 is a fragmentary cross-sectional view, on an enlarged scale, taken on the line 10—10 of Fig. 8;

Fig. 11 is a fragmentary cross-sectional view, on an enlarged scale, taken on the line 11—11 of Fig. 9;

Fig. 12 is a view similar to Fig. 10, but showing the mask valve in open position;

Fig. 13 is a cross-sectional view, taken on the line 13—13 of Fig. 11;

Fig. 14 is a cross-sectional view, taken on the line 14—14 of Fig. 11;

Fig. 15 is a fragmentary perspective view of the locking device shown in Fig. 12;

Fig. 16 is a fragmentary cross-sectional view, showing an alternative arrangement of the valve for admitting an auxiliary oxygen supply into the mask, and Fig. 17 is a view, partly in elevation and partly in section, showing a manual resuscitation bellows which is adapted for use in combination with the other parts shown in Figs. 1 and 8.

Referring more particularly to Figs. 1 to 7 inclusive, of the drawings, the apparatus will be seen to comprise a central body member 1, of tubular form having axially spaced openings 2 and 3 communicating with a passageway 4 in a forwardly extending branch 5 of the body member 1. The body member 1 is also provided with a rearwardly extending branch 6, which also communicates with the openings 2 and 3 and passageway 4.

The forwardly extending branch 5 terminates in a flange 7 or cap from which a threaded annular collar 8 extends and to which one end of a cylinder 9 is secured. The other end of the cylinder 9 is threaded for the attachment thereto of a cap 10 having an axial tubular extension 11 forming a passageway 12 which is in axial alignment with the passageway 4.

Threadedly secured within the forward end of the extension 11 is a tubular element 13 having an annular flange 14 at its forward end, the rear face of this flange having an annular recess 15 within which a sealing ring 16 of synthetic rubber, such as neoprene, is frictionally secured.

Mounted for limited slidable reciprocal movement along the outer face of the element 13 is a sleeve 17, having a rear portion which overhangs the forward end of the tubular extension 11 of the cap 10 and forms with the outer surface of the element 13, an annular chamber 18, within which a compression coil spring 19 is disposed. The rear end of the spring 19 abuts the forward end of the extension 11, while the forward end of this spring abuts a packing follower 20, which is threadedly secured within the sleeve 17, in spaced relation to a shoulder 21 of the sleeve. An O ring 22 is disposed about the tubular element 13, in the space between the follower 20 and the shoulder 21.

The sleeve 17 is also provided with an annular shoulder or ledge 23 to which a face mask 24 is clamped, as by means of a nut 25, which is threadedly secured to the sleeve. The action of the spring 19 is to normally force the forward end of the sleeve 17 against the sealing ring 16, as shown in Fig. 7. The mask 24 is provided with an inflatable face-engaging seal 26 of soft rubber, which extends from the periphery of the mask, and from which a tube 27 extends. The tube 27 is provided with a plug 28 in which a stem 29 is threadedly secured, the seal 26 being inflatable by means of air supplied through the stem and plug.

The tubular element 13 is also provided at diametrically-opposite sides thereof, adjacent its closed forward end, with openings 30 and 31, which are normally closed by the sleeve 17.

Secured to the branch 6 of the body member 1 is a rebreathing bag 32 of soft rubber or the like, constituting a storage tank for the various gases, as will be presently explained, this bag, when not in use, being fully deflated, as shown in Fig. 2.

Frictionally secured within each of the openings 2 and 3 of the body member 1 is a stop element 33 having an annular flange 34 which abuts a shoulder 35 formed by a counterbore 36 in the body member. The stop element is provided with an axial passageway 37, which has a portion 38 of reduced diameter, the outer end of which terminates at a channel or groove 39 which extends diametrically across the outer end of the stop element. The function of this stop element will be presently described.

The body member 1 is adapted for the threaded securement thereto of receptacles which contain various gases under pressure, as will be presently explained. Each of these receptacles comprises a cylinder 40, provided with knurled portions 41 and 42 which facilitate rotation of the cylinder. The cylinder 40 is provided at one end with a closure cap 43 which is threadedly secured to the cylinder, a gasket 44 being interposed between the cap and cylinder end to avoid leakage. The cylinder is provided at its other end with a wall 45 having a central opening 46 therein. A neck 47 extends from the wall 45 and is threaded exteriorly for connection to threads 48 in a counterbore 49 of the body member 1.

The neck 47 is also interiorly threaded for the connection thereto of a check valve 50, which is slidable in the counterbore 36, an O-ring 51 being interposed between the check valve and the wall of the counterbore to prevent leakage at this point. The O-ring 51 is preferably made of a material which is not affected by cyclopropane. The valve is provided with an axial bore 52 in which a valve stem 53 is slidably mounted. The stem 53 is provided at its outer end with a head 54 provided with a beveled surface 55, the head, in turn, provided with an extension 56 of slightly reduced diameter.

A washer 56a is disposed between the end wall 45 and the outer end of the check valve 50, and a compression coil spring 57 is interposed between this washer and the head 54 of the valve stem for normally maintaining the beveled surface 55 of the valve stem in contact with an annular seat 58 disposed in a counterbore 59 of the valve 50. The valve seat 58 is also made of a material which is not affected by cyclopropane. The extension 56 of the head 54 of the valve stem serves to prevent lateral displacement of the spring 57, which is of somewhat smaller external diameter than the counterbore 60 of the valve 50 in which the spring is disposed. The valve 50 is also provided with counterbore 61 for receiving the outer end of the stop element 33 when the receptacle is screwed into the body member 1.

It will be apparent from the foregoing description that when the cylinder 40 is screwed into the body member 1 to a sufficient extent, the inner end of the valve stem 53 will come into engagement with the outer end of the stop element 33. The stem 53 has a diameter which is slightly larger than the width of the groove 39 of the stop element, so that when the stem abuts the stop element, it cannot enter this groove, and thus close the outer end of the passageway 38. The stem 53, in other words, straddles this groove. After the stem engages the stop element, the stem is pushed outwardly, thereby lifting the head 54 from the seat 58, and permitting the contents of the cylinder 40 to expand into gaseous form and escape into the bag 32 by way of the opening 46, counterbore 60, seat 58, the space between the stem 53 and wall of the bore 52, which is about .002" in width, groove 39, passageways 38 and 37, passage 4 and branch 6. The gas which thus enters the bag 32 causes the bag to expand, thereby providing a visual indication at all times that the contents of the cylinder 40 are leaving the cylinder.

In Fig. 6 of the drawings, the openings 30 and 31 are exposed to the interior of the mask 24, so that gas from the rebreathing bag 32 can flow into the mask. In this position of the parts, the spring 19 has been compressed, and the sleeve 17 is maintained in the position shown during use of the mask by means of a collar 62 which is slidable along the sleeve 17 and has a bore 63 forming a shoulder 64, between which and a shoulder 65 on the sleeve 17 a compression coil spring 66 is interposed. This spring maintains the collar 62 in the position shown, in which position the collar maintains a series of circumferentially-spaced balls 67 in an annular groove 68 in the cap 10, the balls lying in circumferentially-spaced radial openings 69 in the sleeve 17. The collar 62, acting on the balls 67, thus functions to lock the sleeve 17 in a position in which the gases may escape into the mask through the openings 30 and 31.

The collar 62 is prevented from sliding off the rear end of the sleeve 17 by means of a snap ring 70, which is snapped into an annular groove 71 in the sleeve 17, and extends radially into a counterbore 72 in the collar.

The openings 30 and 31 may be automatically closed by merely pushing the collar 62 a short distance to the right, as viewed in Fig. 7, and against the tension of the spring 66. This movement, which is substantially equivalent to the diameter of the balls 67, permits the balls to move radially-outwardly into the counterbore 72, permitting the spring 19 to expand and thereby automatically moving the sleeve 17 and mask 24 to a position in which the sleeve closes the openings 30 and 31 against egress of gases therethrough into the mask. During this movement of the sleeve, the balls 67 are carried by the sleeve out of the groove 68 and over an annular ridge 73 of the cap 10 and into an annular recess 74 in which they are maintained by the collar 62. To reopen these openings, it is only necessary to push the collar 62 back to the open position shown in Fig. 6.

The flange 7 and collar 8 of the branch 5 of the body member 1, the cylinder 9 and the cap 10 form a canister within which soda-lime or other mixture for absorbing carbon dioxide is disposed. The soda-lime or similar mixture are maintained within the cylinder by means of screens 75 and 76 which are frictionally held within the collar 8 and cap 10 respectively by means of washers 77.

Means have also been provided for the admission, at times, of oxygen, into the bag 32, as from a wall connector or reservoir. Such means comprises a tubular valve body 78 which is frictionally secured within a rearward tubular extension 79 of the bag, and is internally threaded for the connection therewith of a valve stem 80 having an axial passageway 81. The valve body is counterbored as at 82, forming an annular shoulder 83, and within this counterbore, a portion 84 of enlarged diameter, of the valve stem slides, an O-ring 85 being interposed between the portion 84 of the stem and the wall of the counterbore.

The stem 80 has an annular flange 86 at its forward end, the rear face of this flange having an annular recess 87 within which a sealing ring 88 is frictionally secured. The stem is also provided at diametrically opposite sides thereof with openings 89 and 90 which are normally closed by the wall of the counterbore 82. A knob 91 is soldered to the lower portion of the stem 80 to facilitate rotation of the stem for the purpose of opening and closing the valve. When the valve is fully open, the knob 91 abuts the lower end of the valve body 78, and when it is fully closed, the portion 84 of the valve stem abuts the annular shoulder 83. The valve stem is adapted for the connection thereto of a rubber hose (not shown) for introducing oxygen into the bag 32 from a wall connection or reservoir, other than the receptacles.

The apparatus which has thus been described forms an extremely compact and portable unit, consisting of a minimum number of parts which can be inexpensively manufactured and assembled.

While it has been designed primarily for anesthetic and analgesic purposes, it may be used for other purposes, as will be described hereinafter.

The receptacles consisting of the cylinder 40, cap 43, and valve associated therewith, may be used for containing, under pressure, the following gases, by way of example:

(a) 1600 to about 3000 cc. cyclopropane
(b) 1600 to about 3600 cc. oxygen
(c) 1000 cc. cyclopropane+1000 cc. helium
(d) 4900 cc. nitrous oxide In order that the receptacles may be readily identified, as to contents, by the anesthetist or other user of the unit, the respective cylinders may be colored or provided with color designations, according to accepted medical standards, as follows:

(a) Orange
(b) Green
(c) Orange and brown
(d) Blue and the ends of the body member 1 which receive these receptacles may be correspondingly colored to insure that the receptacles are secured to the proper end of the body member, if such assurance is necessary or desired.

In the use of the device for anesthetic purposes, and assuming that it is desired to use a mixture of cyclopropane and oxygen on the patient, the anesthetist will attach a cylinder (a) of cyclopropane to one end of the body member 1, and a cylinder (b) of oxygen to the other end of the body member, the attachment being made without opening the valves of the respective cylinders. He will then manipulate the collar 62 in a manner such as already described to insure that the openings 30 and 31 of the sleeve 17 are closed, so that no gas can escape into the mask before the unit is ready for use, and will also see that that valve at the rear end of the bag 32 is closed, so that no gas can inadvertently escape from the bag.

Having observed these precautions, he will screw the cyclopropane cylinder inwardly with one hand while holding the unit by means of the oxygen cylinder in the other hand, to thereby release the cyclopropane into the bag 32 in any desired amount. At this point, it may be noted that the relatively small space (.002") between the valve stem 53 and the wall of the bore 52 causes the flow of gas to be throttled in a desired manner, thereby greatly facilitating a controlled filling of the beg. It may also be noted that since the valve closes automatically, the anesthetist may be quickly able to stop the flow by the mere act of unscrewing the cylinder a turn or two.

After the cyclopropane has been released into the bag, oxygen is similarly admitted into the bag from the oxygen cylinder in any desired amount, usually in some more or less fixed proportion to the cyclopropane, after which the flow of oxygen from the oxygen cylinder is stopped.

It may be further noted that the cyclopropane and oxygen cylinders are of such a size that under normal conditions of anesthesia administration, no harm can result to a patient even if the entire contents of the cylinders are given to the patient. This is in contrast to usual anesthetic administration in which a large, bulky cylinder of gas is used, which, if accidentally left open, could result in a lethal dose being given to a patient.

The use of such small cylinders for the gases has another distinct advantage in that it greatly reduces explosion or fire hazards, since even if one or both cylinders exploded, it would not cause any appreciable harm to a patient, or damage to the operating room or hospital. This is also in contrast to the use of large reservoir cylinders in the usual method, which, on exploding, have been known to kill not only the patient and others in the immediate vicinity, but to actually blow out walls of rooms or the hospital.

It has been found through experiments that the explosion hazard is reduced by introducing the cyclopropane into the rebreathing bag before the oxygen in introduced therein. The use of separate cylinders of gases, as well as the manner in which the cylinders are manipulated to free the gases therefrom greatly facilitates this sequential operation.

When the bag has been filled with the desired mixture of cyclopropane and oxygen, which is ready to be administered to the patient, the anesthetist, using the cylinders as handles, places the mask against the face of the patient, adjusting the mask until it is properly fitted. He then pulls the collar 62 towards the cap 10 to lock the valve in open position to uncover the openings 30 and 31 and permit the gas to enter the mask.

An extremely important feature of the invention resides in the use of the metallic gas containers or receptacles as the handles for holding and manipulating the unit, thereby dispensing with the need for handles separate from the containers.

Another important feature resides in the location of these receptacle-handles, with reference to the unit. Their extension laterally of the body member 1, as well as their general position substantially parallel to the face of the patient during use and operation of the unit greatly facilitates manipulation of the unit, and makes for a high order of efficiency in such use. In administering a 50–50 oxygen-cyclopropane mixture to a patient, with the unit, it was found in many cases that an average of six breaths of the mixture produced anesthesia, with complete loss of consciousness for about one to three minutes, and an aura of analgesia and euphoria of about five to thirty minutes' duration.

The apparatus makes highly feasible the use of a calculated mixture of nitrous oxide and cyclopropane, to be used with maintenance oxygen, thereby reducing the explosion hazard and enabling a desired benefit to be derived from the use of two such synergistic anesthetic gases.

From a practical standpoint, substantially all of the parts of the unit, with the exception of the rubber parts are preferably made of spark-proof aluminum, containing no paint or grease which might accentuate the explosion factor. The valve stem 53 and screens 75 and 76 are preferably made of stainless steel. The mask and rebreathing bag are preferably made of conductive rubber. The cylinder 9 is preferably made of a plastic, such as clear Lucite, so as to facilitate observation of the lime-soda contents of the cylinder, to permit replacement of such contents when a change of color thereof indicates saturation of the soda-lime with carbon dioxide. In order to eliminate the possibility of a spark being created between the parts 7 and 8, the cylinder 9 is preferably made of a conductive plastic material, or a wire (not shown) may be extended axially through the cylinder, with its ends connected to the screens 75 and 76.

Among the manifold uses of the unit in present-day clinical anesthesia, resuscitation and oxygen inhalation may be mentioned its use in obstetrical deliveries, dental extractions, setting of fractures, control of hemorrhage, drowning accidents and mine explosions, pediatrics and for cardiac patients.

Among other advantages of the unit may be mentioned its reduction of the explosion potential, its low cost, its portability, and its easy maneuverability.

In Figs. 8 to 15 inclusive, a modification of the respirator is shown in which somewhat different means is provided for furnishing the gases, as well as somewhat different means for opening the mask valve.

In the modification, the body member 101 has axially spaced openings 102 and 103 communicating with a passageway 104 which extends at right angles to the openings 102 and 103 and terminates in an annular shoulder 105. Disposed within this passageway 104, with one end thereof in abutment with the shoulder 105, is a baffle 106, made of a short length of tubing, having diametrically opposite sides thereof provided with flats 107 and 108, which coact with the wall of the passageway 104 to provide passageways 109 and 110, through which the gases from openings 102 and 103 are constrained to pass into the bag 111.

The openings 102 and 103 are counterbored as at 112, for the reception of a spring-pressed ball 113, which is seated against an O-ring 114, secured in position by means of a member 115 which is threadedly secured in the body member 101. The member 115 is provided with an axial opening 116, in which a tubular element 117 is mounted for sliding movement, the element being provided with a piercing point 118 which overlies the passageway through this element but does not completely block the same. The tubular element 117 is provided with an annular flange 119 which is slidable in a counterbore 120 of the opening 116, and which is adapted for abutment with a shoulder 121 of the member 115 to limit the inward movement of the element 117. The inner end of the element 117 is provided with a transversely extending groove 122, so that when the element 117 comes into engagement with the ball 113, passage of gases into the counterbore 112 is not blocked by the ball.

Threadedly secured to the ends of the body member 101 is a pair of handles 123 and 124 which handles are made hollow, so as to receive a bulb or cartridge 125 containing a gas under pressure. The cartridges illustrated are similar to cartridges which are presently in general use for the storage of carbon dioxide. In such cartridges, the gas is stored under pressure and therefore, it is possible to store a relatively large volume of gas in a limited space. For the particular purposes for which the present respirator is designed, such for example as for anesthesia purposes, the cartridges may contain any of the gases under pressure which have hereinbefore been described.

Each of the bulbs or cartridges 125 is provided with a closure or stopper 126 of soft metal, which can be pierced in a manner to be now described.

Each of the bulbs or cartridges 125 has a neck 125a of reduced diameter, which is slidable through an O-ring seal 127 which is retained in position by means of a washer 128 secured to the outer end of the member 101.

In the use of the device, the cartridges are first placed in the handles 123 and 124 in the manner shown in Fig. 11, after which the handles are screwed to the body member 101 in the manner shown in this figure.

As the handles are thus screwed to the body member, the tubular elements 117 are first pushed inwardly so as to lift the ball 113 from its seat and permit the gases which are subsequently released from the cartridges to enter the body member. After the annular flange 119 comes into abutment with the shoulder 121, continued rotation of the handle member causes the closure 126 of the cartridge 125 to be pierced by the piercing point 118, thereby releasing the gases, in the form of an expanding gas from one or both cartridges. The gas passes into the body member 101 through the passageways 109 and 110, passing thence into the bag 111, distending the latter, and rendering the gas or mixture of gases quickly available for use.

It may be noted at this point that one of the cartridges 125, preferably the one containing oxygen, is compressed at the bottom end thereof to provide flats 125b and 125c (see Figs. 11 and 14) which, when the cartridge has been placed in the handle 124, engage similar flat surfaces 124a and 124b of the inner wall of the handle 124. This makes it impossible, if only the handle 124 has the flat surfaces 124a and 124b, to place two anesthetic gas cartridges in the device at the same time, since the anesthetic gas cartridge, which is cylindrical at the bottom, will not fit into the handle 124.

The provision of the aforesaid cartridge having a portion of non-circular exterior configuration adapted for cooperation with a complementary interior of the handle or holder provides an additional advantage, which may be explained as follows: The piercing point 118 is not always a true cone, so that the complementary flat surfaces on the cartridge and holder prevent relative rotation between the holder and cartridge, thereby giving a more accurate control of the piercing action to release the gas from the cartridge.

In this form of the device, the forwardly extending branch 131 of the body member 101 does not terminate in a flange which is integral with the branch, but instead, a separate cap 132 is provided which is threadedly secured to the branch 131. The cap 132 is provided with a threaded annular collar 133, to which one end of a cylinder 134 is secured. The other end of the cylinder is threaded for the attachment thereto of a cap 135 which is interiorly threaded for the connection thereto of a connector 136 having an annular groove 137 in its outer surface, and an axial passageway 138 which is in axial alignment with the passageway 104.

Threadedly secured within the forward end of the connector 136 is a tubular element 139 which is similar in all respects to the element 13. Mounted for limited slidable reciprocal movement along the outer face of the element 139 is a sleeve 140 having a rear portion which overhangs the forward end of the connector 136 and forms with the outer surface of the element 139 an annular chamber 141 within which a compression coil spring 142 is disposed. The rear end of the spring 142 abuts a shoulder 143 of the connector, while the forward end of this spring abuts a packing follower 144 which is threadedly secured within the sleeve 140.

The tubular element 139 is also provided at diametrically opposite sides thereof, adjacent its closed forward end, with openings 145 and 146, which are normally closed by the sleeve 140, due to the action of the spring 142.

For the purpose of pulling the sleeve 140 rearwardly against the action of the spring 142, so as to uncover the openings 145 and 146, a finger-piece is provided, which consists of an open loop 147 disposed directly above the rear portion of the sleeve 140. Secured to the lower portion of this loop 147 is a pair of wire elements 148 and 149, bent at their forward ends to provide arcuate portions 150 which embrace the sleeve 140 and terminate in stub shafts 151 which are pivotally connected to the sleeve at diametrically opposite sides thereof, and are bent at their rear ends to provided arcuate portions 152 which partially encircle the connector 136.

When it is desired to uncover the openings 145 and 146, the finger-hold 147 is grasped and pulled rearwardly until the portions 152 are opposite the groove 137 in the connector 136, after which the portions 152 are entered into the groove, thereby locking the sleeve 140 in a position in which the openings 145 and 146 are uncovered.

Upon lifting the portions 152 of the finger-hold out of the groove 137, the spring 142 functions to automatically close the openings 145 and 146.

Grooves 153 and 154 (Fig. 15) are provided in the outer wall of the sleeve 140, into which the portions 150 of the wire elements 148 and 149 are adapted to snap, for the purpose of latching the finger-hold in its locking and releasing positions.

In Fig. 16, a modification is shown, in which, instead of providing the outer end of the rebreathing bag 32 with a valve, such as shown in Fig. 5, for admitting an auxillary supply of oxygen, a similar valve is provided for admitting such auxiliary oxygen directly into the body member 1. For this purpose, the body member 1 is provided intermediate its ends with an upwardly and rearwardly extending branch 155, in which the valve 156 is mounted. Since this valve is virtually identical in construction and use with that shown in Fig. 5, a detailed description thereof is unnecessary.

In Fig. 17, a modification is shown, in which the rebreathing bag 32 or 111 has been replaced with a bag of a type which is conventionally used as a mechanical resuscitator. The bag 157 in this case, is of the bellows or accordion type, is made of soft rubber or the like, and is provided with a handle 158 for facilitating expanding and collapsing of the bag.

The outer end wall of the bag is provided with a valve comprising a valve housing 159 having openings 160 and 161 in the wall thereof, a valve 162 which normally closes the opening into the bag, and which is maintained in seated position by a compression coil spring 163.

The construction and function of such bags is well-known, and need not therefore be described. It is to be noted, however, that the axis of the bag is in direct alignment with the branch 6 (or 101) of the body member and with the connection between the body member and mask, so that a direct push on the collapsible bag can be made toward the face of the patient and thereby produce the action desired.

It is to be understood that the forms of our invention, herewith shown and described, are to be taken as preferred examples of the same, and that various changes in the shape, size and arrangement of parts may be resorted to, without departing from the spirit of our invention, or the scope of the subjoined claims.

Having thus described our invention, we claim:

1. In a device of the character described, a hollow body member having an outlet branch, hollow handles secured to said body member, said handles containing gases under pressure, a tubular element in communication with said outlet branch, said element having outlet openings, a valve element normally closing said openings, and a mask secured to one of said elements, said valve element being responsive to relative movement of said elements to open and close said openings.

2. In a device of the character described, a hollow body member having an outlet branch, hollow handles secured to said body member, said handles containing gases under pressure, a tubular element in communication with said outlet branch, said element having outlet openings, a sleeve normally closing said openings, and a mask secured to said sleeve, said sleeve being responsive to relative movement of said body member toward said mask to uncover said openings to thereby feed said gases from said branch into said mask.

3. A device, as defined in claim 2, in which spring means are provided for normally maintaining said sleeve in a position to cover said openings.

4. A device, as defined in claim 3, in which said mask is removably clamped to said sleeve, and a sealing ring is interposed between said sleeve and tubular element, the sleeve being movable from the sealing ring to provide a space through which the gases pass into said mask from said openings.

5. A device, as defined in claim 4, in which said body member is provided with a second branch extending rearwardly therefrom and in communication with the interior of said body member, and an inflatable bag is secured to said second branch for temporarily storing said gases.

6. A device, as defined in claim 5, including means for admitting oxygen or the like into said body member from an external source, said means comprising a tubular extension from said body member.

7. In a device of the character described, a hollow body member having an outlet branch, hollow handles secured to said body member, cartridges containing gases under pressure disposed within said handles, said cartridges having puncturable closures, puncturing means disposed within said body member and responsive to attachment of said handles to said body member to puncture said closures whereby to release said gases for passage into said body member, a tubular element in communication with said outlet branch, said element having outlet openings, a valve element normally closing said openings, and a mask secured to one of said elements, said valve element being responsive to relative movement of said elements to open and close said openings.

8. In a device of the character described, a hollow body member having an outlet branch, hollow handles secured to said body member, cartridges containing gases under pressure disposed within said handles, said cartridges having puncturable closures, puncturing means disposed within said body member and responsive to attachment of said handles to said body member to puncture said closures whereby to release said gases for passage into said body member, a tubular element in communication with said outlet branch, said element having outlet openings, a sleeve normally closing said openings, and a mask secured to said sleeve, said sleeve being responsive to relative movement of said body member toward said mask to uncover said openings to thereby feed said gases from said branch into the mask.

9. A device, as defined in claim 8, in which spring means are provided for normally maintaining said sleeve in a position to cover said openings.

10. A device, as defined in claim 9, in which said mask is removably clamped to said sleeve, and a sealing ring is interposed between said sleeve and tubular element, the sleeve being movable from the sealing ring to provide a space through which the inhalant passes into the mask from said openings.

11. A device, as defined in claim 10, in which said puncturing means comprises elements disposed in said body member and having points adapted to pierce said closures when the handles are screwed to said body members.

12. A device, as defined in claim 11, in which said body is provided with a second branch extending rearwardly therefrom and in communication with the interior of said body member, and an inflatable bag is secured to said second branch for temporarily storing said gases.

13. A device, as defined in claim 12, including means for admitting oxygen or the like into said body member from an external source, said means comprising a tubular extension from said body member.

14. In a device of the character described, a hollow body member having an outlet branch, hollow handles movably secured to said body member, said handles containing gases under pressure, an inflatable member secured to said body member and adapted to store gases released from said handles, and normally-closed valve means for admitting said gases from said handles into said body member, said valve means opened in response to movement of said handles relative to said body member.

15. A device, as defined in claim 14, including a mask operatively connected to the outlet branch of said body member, and an absorbent for carbon dioxide interposed between said mask and said outlet branch.

16. In a device of the character described, a hollow body member, hollow handles removably secured to said body member, a cartridge containing a gas under pressure disposed within one of said handles, a second cartridge containing a different gas under pressure disposed within the other of said handles, and means in said second handle for preventing insertion of said first cartridge in said second handle.

17. A device, as defined in claim 16, in which said means comprises flat surfaces in the interior of said second handle, and non-registering rounded surfaces on the exterior of said first cartridge.

18. In a device of the character described, a hollow body having an outlet opening, hollow handles secured to said body member, said handles containing gases under pressure, a tubular element in communication with said outlet opening, said element having an outlet opening, a valve element normally closing said last-named opening, and means movable in unison with one of said elements for feeding said gases to a patient, said valve element being responsive to relative movement of said elements to open and close said last-named outlet opening.

19. In a device of the character described, a hollow body member having an outlet opening, hollow handles secured to said body member, said handles containing gases under pressure, a tubular element in communication with said outlet opening, said element having an outlet opening, a sleeve normally closing said last-named opening, means movable in unison with said sleeve for feeding said gases to a patient, said sleeve being movable to uncover said last-named opening to feed said gases from said first-named outlet opening into said means.

20. In a device of the character described, a hollow body member having an outlet opening, hollow handles secured to said body member, cartridges containing gases under pressure disposed within said handles, said cartridges having puncturable closures, puncturing means disposed within said body member and responsive to attachment of said handles to said body member to puncture said closures whereby to release said gases for passage into said body member, a tubular element in communication with said outlet opening, said element having an outlet opening, a valve element normally closing said last-named opening, and means for feeding said gases to a patient, said means movable in unison with one of said elements, said valve element being responsive to relative movement of said elements to open and close said last-named outlet opening.

21. In a device of the character described, a hollow body member having an outlet opening, hollow handles secured to said body member, cartridges containing gases under pressure disposed within said handles, said cartridges having puncturable closures, puncturing means disposed within said body member and responsive to attachment of said handles to said body member to puncture said closures whereby to release said gases for passage into said body member, a tubular element in communication with said outlet opening, said element having an outlet opening, a sleeve normally closing said last-named opening, and means for feeding said gases to a patient, said means movable in unison with said sleeve, said sleeve being movable to uncover said last-named opening to feed said gases from said first-named outlet opening into said means.

22. In a device of the character described, a hollow body member having an outlet opening, hollow handles secured to said body member, cartridges containing gases under pressure disposed within said handles, said handles having puncturable closures, puncturing means within said body member and responsive to attachment of said handles to said body member to puncture said closures whereby to release said gases for passage into said body member, a tubular element in communication with said outlet opening, said element having an outlet opening, a sleeve normally closing said last-named opening, said sleeve movable to uncover said last-named opening, and means for locking said sleeve in a position in which said last-named opening is uncovered.

23. A device, as defined in claim 22, in which said locking means comprises an element pivotally connected to said sleeve.

24. A device for administering gases to human beings and consisting of a hollow body member, a face mask secured thereto and having communication with said body member, two gas-containing hollow holders not substantially larger than ones capable of being completely embraced by a human hand, said holders communicating with opposite sides of said body member, a rebreather bag communicating with said body member, a carbon-dioxide absorbent in communicating connection between said bag and mask, means for controlling gas communication between said holders and said body member, and means for controlling communication between said body member and said mask, wherein said holders are of different configuration, whereby two different gases may be administered using the configurations as a guide.

References Cited in the file of this patent

UNITED STATES PATENTS

| | | |
|---|---|---|
| 1,203,391 | O'Donnell | Oct. 31, 1916 |
| 1,449,047 | Johnson | Mar. 20, 1923 |
| 2,066,517 | Campbell | Jan. 5, 1937 |
| 2,222,247 | Ward | Nov. 19, 1940 |
| 2,310,021 | Heidbrink | Feb. 2, 1943 |
| 2,428,425 | Levitt | Oct. 7, 1947 |

FOREIGN PATENTS

| | | |
|---|---|---|
| 100,605 | Germany | Dec. 31, 1898 |